US010594953B2

(12) United States Patent
Kumar

(10) Patent No.: US 10,594,953 B2
(45) Date of Patent: Mar. 17, 2020

(54) CAMERA IDENTIFICATION IN VIDEO PRODUCTION SYSTEM

(71) Applicant: SLING MEDIA PVT LTD, Bengaluru (IN)

(72) Inventor: Amit Kumar, Bengaluru (IN)

(73) Assignee: SLING MEDIA PVT LTD, Bengaluru (IN)

( * ) Notice: Subject to any disclaimer, the term of this patent is extended or adjusted under 35 U.S.C. 154(b) by 0 days.

(21) Appl. No.: 16/011,395

(22) Filed: Jun. 18, 2018

(65) Prior Publication Data
US 2019/0199938 A1    Jun. 27, 2019

(30) Foreign Application Priority Data
Dec. 26, 2017   (IN) .............................. 201741046556

(51) Int. Cl.
| | |
|---|---|
| H04N 5/268 | (2006.01) |
| H04N 21/234 | (2011.01) |
| H04N 5/232 | (2006.01) |
| G06T 7/80 | (2017.01) |
| H04N 5/247 | (2006.01) |

(52) U.S. Cl.
CPC .............. *H04N 5/268* (2013.01); *G06T 7/80* (2017.01); *H04N 5/23206* (2013.01); *H04N 5/247* (2013.01); *H04N 21/23418* (2013.01); *G06T 2207/10016* (2013.01)

(58) Field of Classification Search
CPC ....... H04N 5/268; H04N 5/23206; G06T 7/80
See application file for complete search history.

(56) References Cited

U.S. PATENT DOCUMENTS

| | | | | |
|---|---|---|---|---|
| 2004/0120545 | A1* | 6/2004 | Nishino | ................ G06T 7/0002 382/100 |
| 2013/0051763 | A1 | 2/2013 | Gong | |
| 2013/0166711 | A1 | 6/2013 | Wang et al. | |
| 2016/0142778 | A1* | 5/2016 | Moribe | ............ H04N 21/21805 725/90 |
| 2016/0197771 | A1 | 7/2016 | Kumar et al. | |

* cited by examiner

*Primary Examiner* — Ahmed A Berhan
(74) *Attorney, Agent, or Firm* — Lorenz & Kopf LLP

(57) ABSTRACT

Systems and processes are provided to identify a first camera model associated with a first video capture device of video capture devices within a system that aggregates video feeds from the video capture devices. A process includes receiving, by the video processing device, a first video sample from the first video capture device; sending, from the video processing device, a first command to the first video capture device; receiving, by the video processing device, a second video sample from the first video capture device subsequent to the sending of the first command; evaluating, by the video processing device, the first video sample and the second video sample in view of the first command to identify a first command response; and determining the first camera model based on the identified first command response.

18 Claims, 2 Drawing Sheets

CAMERA IDENTIFICATION IN VIDEO PRODUCTION SYSTEM

PRIORITY CLAIM

Figure 1:
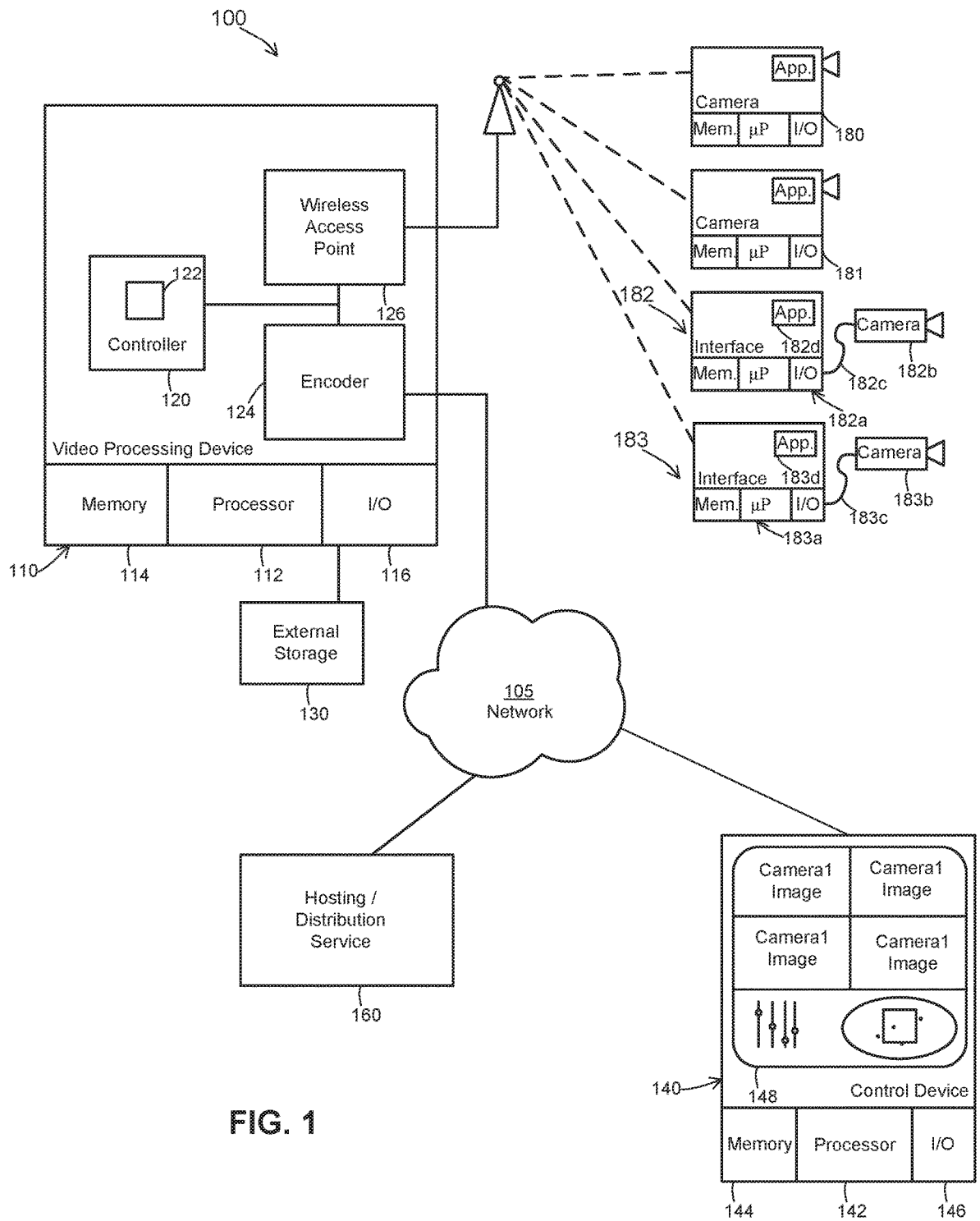

This application claims priority to India Provisional Patent Application Serial No. 201741046556, which was filed on 26 Dec. 2017.

TECHNICAL FIELD

The following discussion generally relates to the production of video content, especially live video content. More particularly, the following discussion relates to identifying cameras that capture the video content in a video production system.

BACKGROUND

Recent years have seen an explosion in the creation and enjoyment of digital video content. Millions of people around the world now carry mobile phones, cameras or other devices that are capable of capturing high quality video and/or of playing back video streams in a convenient manner. Moreover, Internet sites such as YOUTUBE have provided convenient and economical sharing of live-captured video, thereby leading to an even greater demand for live video content.

Occasionally, device users with cameras having unknown characteristics may attempt to participate in the production of video content. In such instances, the additional information, particularly an identification of the camera model or make, may be advantageous, e.g., to improve the video processing on the received video and/or to facilitate device control by a system user or system control device. With conventional video production systems, the lack of this information may result in the corruption or loss of the associated video stream.

It is therefore desirable to create systems and methods that are able to improve camera identification in a video production environment. Other desirable features and characteristics will become apparent from the subsequent detailed description and the appended claims, taken in conjunction with the accompanying drawings and this background section.

BRIEF SUMMARY

Various embodiments provide systems, devices and processes to identify camera characteristics in a video production environment. As described more fully below, if the system is initially unable to identify the camera model and associated characteristics, the camera user may be instructed to direct the camera at a stationary device and capture a video sample. A prospective command representing a camera function may be provided to the camera and a resulting video sample is evaluated to determine if the changes indicate that the command response meets expectations for the respective function or otherwise narrows the potential models of camera. The prospective commands continue until one or more confirmed command and response combinations match a particular model of video camera. Upon identifying the camera model, the controller may associate the camera with the corresponding network identifier for future reference.

In one example, a computer-implemented process is executable by a video processing device that aggregates video feeds from a plurality of video capture devices to identify a first camera model associated with a first video capture device of the plurality of video capture devices. The process includes receiving, by the video processing device, a first video sample from the first video capture device; sending, from the video processing device, a first command to the first video capture device; receiving, by the video processing device, a second video sample from the first video capture device subsequent to the sending of the first command; evaluating, by the video processing device, the first video sample and the second video sample in view of the first command to identify a first command response; and determining the first camera model based on the identified first command response.

In another example, a video processing device is provided and is configured to aggregate video feeds from a plurality of video capture devices and to distribute the aggregated video feeds to user devices over a wireless network. The video processing device includes a processor and a computer-readable storage medium storing a computer-executable code that, when executed by the processor, causes the video processing device to perform operations. The operations include receiving a first video sample from a first video capture device of the plurality of video capture devices; sending a first command to the first video capture device; receiving a second video sample from the first video capture device subsequent to the sending of the first command; evaluating the first video sample and the second video sample in view of the first command to identify a first command response; and determining the first camera model based on the identified first command response.

Various additional examples, aspects and other features are described in more detail below.

BRIEF DESCRIPTION OF THE DRAWING FIGURES

Figure 2:
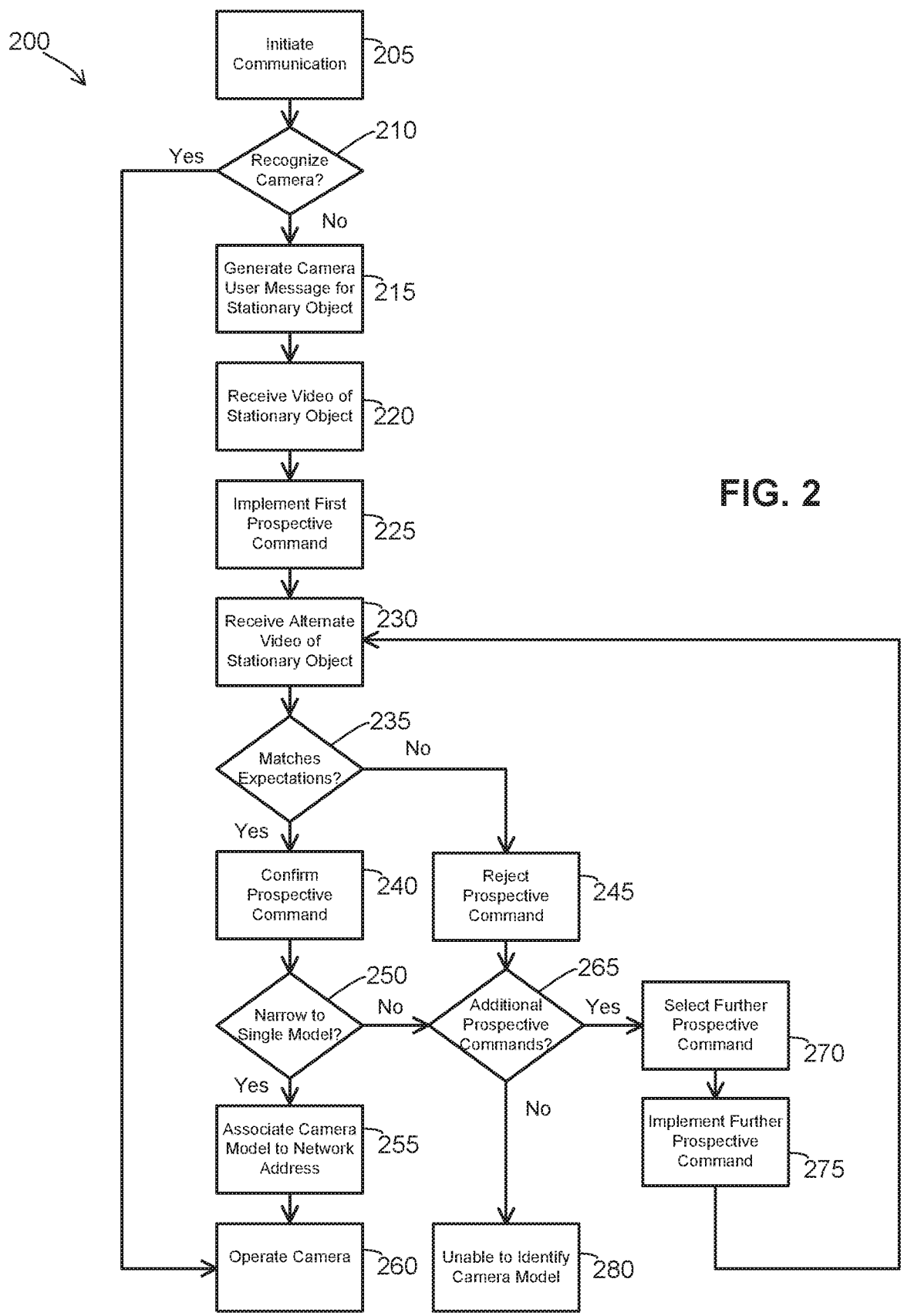

Exemplary embodiments will hereinafter be described in conjunction with the following drawing figures, wherein like numerals denote like elements, and:

FIG. 1 is a diagram of an example system for collecting, producing and distributing live video content; and FIG. 2 is a flowchart of an example process executable by a video processing device for improved camera identification in a video production environment.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

As noted above, various embodiments are able to identify the model of a camera in a video production system. As described more fully below, the camera user may be instructed to direct the camera at a stationary device and capture a video sample. A prospective command representing a camera function may be provided to the camera and a resulting video sample is evaluated to determine if the changes indicate that the prospective command meets expectations for the function or otherwise narrows the potential camera models. The prospective commands continue until one or more confirmed commands match a particular make or model (generally, "model") of video camera. Upon identifying the camera model, the controller may associate the camera with the corresponding network identifier (or IP address) for future reference. Various embodiments may be augmented or modified as desired, and many equivalent embodiments are described herein.

The general concepts described herein may be implemented in any video production context, especially the distribution of live captured video. For convenience of illustration, the following discussion often refers to a video production system in which one or more live video streams are received via a wireless network to produce an output video stream for publication or other sharing. In this example, encoded video may be stored on removable storage, such as a Secure Digital (SD) card, CompactFlash card, USB memory stick, disk drive or other non-volatile storage that could become accidentally disconnected. Equivalent embodiments could be implemented within video cameras, mobile phones, transcoding devices, computer systems or other devices to address any sort of interruptions (e.g., battery depletion, power interruptions, memory full, failure of wired or wireless data connectivity, accidental human interruptions, and or the like).

FIG. 1 shows an example of a video production system 100 that could be used to produce a video program based upon selected inputs from multiple input video feeds. In the illustrated example, system 100 suitably includes a video processing device 110 that selects and encodes a video program based upon instructions received from a control device 140. The encoded video program may be initially stored as a file on an external storage (e.g., a memory card, hard drive or other non-volatile storage) 130 for eventual uploading to a hosting or distribution service 160 operating on the Internet or another network 105.

Video processing device 110 suitably includes processing hardware such as a processor or microprocessor 112, memory 114 and input/output interfaces 116 (including a suitable USB or other interface to the external storage 130). The example illustrated in FIG. 1 shows video processing device 110 including processing logic to implement an IEEE 802.11, 802.14 or other wireless access point 126 for communicating with any number of video capture devices 180, 181 or video capture device systems 182, 183.

Typically, each of the video capture devices 180, 181 or video capture device systems 182, 183 may be associated with a unique network address or identifier, such as a media access control (MAC) address, during communications with the video processing device 110. As described below, the processing device 110 may store information about each of the video capture devices 180, 181 or video capture device systems 182, 183 based on the respective network address.

Generally, the video capture devices 180, 181 may include any number of mobile phones, tablets or similar devices with video capturing capabilities. As shown, the video capture devices 180, 181 may include suitable memory, processing, and input and output functionality to interact with the video production system 100.

Video capture device systems 182, 183 may include one or more interface devices 182a, 183a that enable associated conventional video cameras 182b, 183b to interact with video processing device 110. In one example, the interface devices 182a, 183a receive DVI or other video inputs from the video cameras 182b, 183b via a suitable connection 182c, 183c and transmit the received video to the video processing device 110 via a Wi-fi, Bluetooth or other wireless network, as appropriate.

In one embodiment, the video interface devices 182a, 183a may include any type of network hardware device that enables communication between the processing device 110 and the video cameras 182b, 183b. As examples, the video interface devices 182a, 183a may be in the form of a mobile phone, tablet or similar device executing appropriate logic via video capture application 182d, 183d in order to interact with the video cameras 182b, 183b. In one embodiment, the video interface devices 182a, 183a and the video cameras 182b, 183b may communicate according to the Camera Link communication protocol standard.

The connection 182c, 183c may be any type of connection hardware and/or software that enables communication between the video interface devices 182a, 183a and the video cameras 182b, 183b. In one example, the connection 182c, 183c is an HDMI (High-Definition Multimedia Interface) connection that provides an interface for transmitting video and audio data. In another example, connection 182c, 183c is a Miniature Delta Ribbon connector (MDR-26) and/or a shrunk variant (SDR-26).

Video processing device 110 also includes controller 120 and encoder 124, as appropriate. Controller 120 and/or encoder 124 may be implemented as software logic stored in memory 114 and executed on microprocessor 112 in some embodiments. Controller 120 may be implemented as a control application executing on microprocessor 112, for example, that includes logic 122 for implementing the various processes described herein. Other embodiments may implement the various functions and features using hardware, software and/or firmware logic executing on other components, as desired. Encoder 124, for example, may be implemented using a dedicated video encoder chip in some embodiments.

In various embodiments, video processing device 110 operates in response to user inputs supplied by control device 140. Control device 140 is any sort of computing device that includes conventional processor 142, memory 144, and input/output features 146. Various embodiments could implement control device 140 as a tablet, laptop or other computer system, for example, or as a mobile phone or other computing device that executes a software application 148 for controlling the functions of system 100.

The example illustrated in FIG. 1 shows control application 148 having an interface that shows various video feeds received from video collection devices and systems 180-183 and that lets a control or system user select an appropriate feed to encode into the finished product. Application 148 may include other displays to control other behaviors or features of system 100, as desired. Typically, control device 140 interacts with video processing device 110 via a wireless network 105, although wired connections could be equivalently used.

In operation, then, a system user acting as a video producer would use application 148 to view the various video feeds that are available from one or more video collection devices and systems 180-183. The selected video feed is received from the video collection devices and systems 180-183 by video processing device 110. The video processing device 110 suitably compresses or otherwise encodes the selected video in an appropriate format for eventual viewing or distribution. Some embodiments may provide sufficient internal memory 144 for device 140 to store the encoded video, but many embodiments will store most, if not all, of the encoded video on an external memory card, disk drive or other storage 130.

In some embodiments, the system user may be able to at least partially control the operation of video collection devices and systems 180-183. The system user may use application 148 to modify or initiate some aspect of the video collection devices and systems 180-183 in order to improve or change the video feed captured by the video collection devices and systems 180-183, as an example. In response to user input, the application 148 may generate a command, which is transmitted via network 105 to processing device 110 and subsequently distributed to one or more video collection devices and systems 180-183. The system user may generate commands for a particular video collection devices and system 180-183 or groups of video collection devices, and systems 180-183. In other embodiments, control commands may be generated automatically by the video processing device 110 and/or control device 140 in response to predetermined conditions or settings. For example, such control commands may be implemented as logic 122 in device 110 and/or as part of application 148 in device 140.

As noted above, system 100 may be implemented with cameras 182b, 183b that interface with the video processing device 110 via the interface devices 182a, 183a. The characteristics of the cameras 182b, 183b coupled to the interface devices 182a, 183a may vary and may not always be known by the system 100. The characteristics of the cameras 182b, 183b may be relevant in order to control the associated video capture device system 182, 183, as discussed above. In some instances, the characteristics of the cameras 182b, 183b may be relevant in order to improve the encoding or some other processing aspect of the captured video.

As will now be described, exemplary embodiments may operate to determine the camera characteristics of otherwise unknown video capture devices, such as cameras 182b, 183b. In one example, various embodiments include logic 122 in the video processing device 110 to interface with and ascertain the camera characteristics. Such characteristics may include the available functions of the camera 182b, 183b and how to access such functions.

In one embodiment, the processing device 110 may operate to determine the characteristics of any unknown camera (e.g., camera 182b, 183b). To that end, logic 122 represents hardware, firmware and/or software logic stored in memory 114 or elsewhere that is executable by processing hardware within video processing device 110 to perform the functions described below.

In one embodiment, the logic 122 may include or otherwise access a list of potential cameras organized by model identification. Each camera model may be associated with interface specifications in the form of an array of control signals or commands that activate or implement particular functions on the respective camera, along with any other capabilities or other relevant information about the camera. Generally, as used herein, the term "camera model" may refer to an individual camera model or a group of camera models that share a common interface specification, e.g., as any identifier that represents a collection of camera characteristics. As such, each camera model on the list stored or accessed by the logic 122 may be considered to have a profile of one or more combinations of commands and functions or responses to the respective command from which the particular camera model may be uniquely or substantially identified.

As such, the processing device 110 may communicate with a video capture device having unknown characteristics in order to provide prospective (or test) commands and evaluate the resulting change (or lack of change) to identify the command response, thereby providing a command and command response combination for the camera. If the respective command and command response combination is only applicable to a single camera model, the camera model associated with the respective camera may be identified.

Otherwise, additional command and response combinations may be implemented and evaluated. Since the interface specifications may be different for each model, confirmation (or rejection) of command and function combinations may narrow a list of model possibilities for an initially unknown camera until a single model is identified. In this manner, the processing device 110 may identify the camera model, and thus, ascertain the camera characteristics associated with respective camera.

In some instances, the processing device 110 may have an initial indication of the camera model, e.g., from the network identifier of communications from the camera device. In such cases, the processing device 110 may select the command based on the prospective camera model. In particular, the command may be selected in a manner that minimizes the number of necessary commands to confirm the camera model. As such, one or more command and response combinations may be confirmed (or rejected) in order to derive the camera model.

FIG. 2 shows an example method or process 200 that could be implemented using logic 122 or the like to ascertain camera characteristics. In the example discussed below, the method 200 will be implemented with respect to the characteristics of cameras such as cameras 182b, 183b, discussed above.

In a first step 205, the processing device 110 initializes communication with the interface device associated with the camera via the wireless access point 126. If the interface device is already in communication with the processing device 110 (e.g., the camera device interface initiates communication), this step may be omitted.

In step 210, the processing device 110 may determine if the interface device is associated with a camera having known characteristics. As an example, the processing device 110 may access a stored list of video capture devices or systems that have previously interacted with the system 100. This list of video capturing devices or systems may be organized by network address and include associated camera characteristics for each network address. As such, the processing device 110 may recognize the network address of the video capture device system and retrieve the associated characteristics of the camera.

In step 210, if the processing device 110 recognizes the network address of device and is able to retrieve stored camera characteristics, the method 200 may proceed to step 260 in which the processing device 110 may operate the camera and/or process the associated video content according to the determined characteristics. However, in step 210, if the processing device 110 fails to recognize the network address or is otherwise unable to retrieve the camera characteristics, the method 200 proceeds to step 215. In some embodiments, even upon recognizing the video capture device from the network address, the processing device 110 may continue the method 200 to step 215 in order to confirm that the model associated with the network address is accurate.

In step 215, the processing device 110 generates a message for the camera user to capture a video sample of a stationary object with the camera. The message may be delivered on the interface device or other communications device associated with the camera user.

In step 220, the processing device 110 receives the video sample of the stationary object captured by the camera and transmitted by the interface device. The video sample may be of a sufficient size to satisfy the functions describe herein. In some examples, the video sample may be a still image.

In step 225, the processing device 110 instructs the interface device to implement the first prospective command for the camera. In one embodiment, the first prospective command may be part of an unknown camera protocol. Generally, the unknown camera protocol is a list of one or more prospective camera commands, each representing a command signal or signal combination and an anticipated camera function. As described below, the prospective camera commands of the unknown camera protocol operate to facilitate identification of the camera model. Additional details will be provided below. The anticipated camera functions may include any suitable camera function, such as zoom function, focus, exposure, white or color balance, audio, shutter speed, various types of effects, and the like.

In step 230, the processing device 110 receives the video sample of the stationary object, which at this point may be considered an alternate video sample in view of the prospective camera command. If such alternate video sample is not received, the processing device 110 may generate a message to the camera user to continue capturing video of the stationary object.

In step 235, the processing device 110 evaluates the alternate video sample of the stationary object in view of the original video sample from step 220. In particular, the processing device 110 may compare the alternate video sample to the original video sample in order to evaluate the resulting impact of the intervening camera command. Then, the resulting impact may be evaluated to determine the associated response to the camera command and/or if the resulting impact matches an anticipated or expected impact. For example, if the camera command was associated with a positive zoom function, the alternate video sample is expected to be a closer view of the stationary object from the original video sample. The processing device 110 may use any suitable image recognition and/or video analysis technique to perform this function.

If the resulting impact matches the anticipated impact, then the method 200 proceeds to step 240 in which the prospective command is confirmed. In other words, the camera operates as expected when provided the prospective command. If the resulting impact fails to match the anticipated impact, then the method 200 proceeds to step 245 in which the prospective command is rejected. In other words, the camera does not operate as expected when provided with the prospective command.

Upon confirmation of the prospective command and response combination in step 240, the method 200 proceeds to step 250 in which the processing device 110 determines if the confirmed command and response combination is sufficient to identify the model of the camera. For example, only certain models or only a single model may operate according to the confirmed command and response combination. In effect, a confirmed command and response combination (or series of confirmed command and response combinations) may narrow the list of potential camera models to a subset of the potential cameral models or to a single camera model.

If the confirmed command and response combination narrows the potential camera models to a single camera model, the method 200 proceeds to step 255 in which the camera model is identified and stored with the associated network address. In subsequent interactions, the camera may be more readily identified with the stored information. In a further step 260, the system 100 may be implemented with the identified camera.

Subsequent to rejecting the prospective command in step 245, the method 200 proceeds to step 265 in which processing device 110 determines if the unknown camera protocol includes additional or further prospective commands. The method 200 may also proceed to step 265 if the processing device 110 is unable to identify the model based on a confirmed command and response combination in step 250. If one or more further prospective commands are available, the method 200 may proceed to step 270 in which a further prospective command is selected from the unknown camera protocol. In step 265, if the unknown camera protocol does not include any further prospective commands, the method 200 may proceed to step 280 in which the processing device 110 generates a message for the system user indicating that the system 100 is unable to identify the camera. Such a message may be transmitted to application 148 for communication to the system user.

In step 270, the further prospective command may be selected based on a priority order or based on previously rejected or confirmed prospective command and response combinations. In particular, the further prospective command may be selected based on the ability of the further prospective command to further narrow the potential cameras.

In step 275, the processing device 110 instructs the interface device to implement the further prospective command in the camera. At this point, the method 200 returns to step 230 in which the processing device 110 receives the alternate video sample after implementation of the prospective camera command. Subsequently, the method 200 continues through subsequent steps until the confirmed command and response combination or series of command and response combinations are sufficient to identify the model of the camera in step 250 or until no further prospective commands remain in the unknown camera protocol in step 265.

Generally, steps 236, 240, 245, 250, 265, 270, and 275 may more broadly be considered an operation in which one or more camera commands are generated and the command responses are identified in result in one or more command and response combinations. The command and response combinations are identified until the list of potential camera models are narrowed down to a single camera model, e.g., until one or more of the combinations match only a single profile of potential camera models.

Although the method 200 is described above with respect to the processing device 110, embodiments of the method 200 may be implemented in other ways. For example, the video capture application 182*d*, 183*d* on the video interface devices 182*a*, 183*a* may implement the method 200 in order to ascertain the characteristics of the associated camera 182*b*, 183*b*. In further embodiments, the method 200 may be implemented as part of the control application 148 of control device 140.

As described herein, then, characteristics of an initially unknown camera may be ascertained by confirming or rejecting one or more prospective command and function combinations in order to narrow down a list of potential camera models until a single model remains. The identification of a camera model may improve control of the associated camera and/or the processing of the resulting video production.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

The invention claimed is:

1. A computer-implemented process executable by a video processing device that aggregates video feeds from a plurality of video capture devices to identify a first camera model associated with a first video capture device of the plurality of video capture devices, the process comprising:
   receiving, by the video processing device, a first video sample from the first video capture device;
   sending, from the video processing device, a first command to the first video capture device;
   receiving, by the video processing device, a second video sample from the first video capture device subsequent to the sending of the first command;
   evaluating, by the video processing device, the first video sample and the second video sample in view of the first command to identify a first command response; and
   determining the first camera model based on the identified first command response;
   receiving an initial communication from the first video capture device;
   identifying a network identifier associated with the initial communication;
   accessing stored data to determine if the network identifier associated with the initial communication is linked to information indicating a prospective first camera model; and
   selecting the first command from a group of potential commands based on the prospective first camera model.

2. The process of claim 1, wherein the receiving the first video sample includes receiving video of a first stationary object and the receiving the second video sample also includes receiving video of the first stationary object.

3. The process of claim 1, further comprising:
   sending, upon receiving the initial communication, a request for the first video sample to the first video capture device to capture a first stationary object.

4. The process of claim 3, wherein the sending the request for the first video sample includes sending the first message further requesting for the second video sample to capture the first stationary object.

5. The process of claim 1, further comprising
   identifying a first network identifier associated with the first video capture device; and
   associating and storing the first camera model with the first network identifier.

6. The process of claim 1, wherein the evaluating the first video sample and the second video sample in view of the first command includes identifying the first command response by comparing the first video sample and the second video sample to identify a first distinction between the first video sample and the second video sample that represents the first command response.

7. A computer-implemented process executable by a video processing device that aggregates video feeds from a plurality of video capture devices to identify a first camera model associated with a first video capture device of the plurality of video capture devices, the process comprising:
   receiving, by the video processing device, a first video sample from the first video capture device;
   sending, from the video processing device, a first command to the first video capture device;
   receiving, by the video processing device, a second video sample from the first video capture device subsequent to the sending of the first command;
   evaluating, by the video processing device, the first video sample and the second video sample in view of the first command to identify a first command response; and
   determining the first camera model based on the identified first command response, wherein the determining the first camera model includes:
   accessing a list of potential camera models, each with a command response profile comprising one or more combinations of commands and command responses that identify a respective camera model; and
   identifying the first video capture device as the first camera model if a first combination of the first command and the first command response narrows the list of potential camera models to a single camera model representing the first camera model.

8. The process of claim 7, wherein if the first combination of the first command and the first command response fails to narrow the list of potential camera models to the single camera, the process further comprises:
   sending, from the video processing device, a second command to the first video capture device;
   receiving, by the video processing device, a third video sample from the first video capture device subsequent to the sending of the second command;
   evaluating, by the video processing device, the second video sample and the third video sample in view of the second command to identify a second command response;
   accessing the list of potential camera models; and
   identifying the first video capture device as the first camera model if a second combination of the second command and the first command response in view of the first combination narrows the list of potential camera models to the single camera model representing the first camera model.

9. The process of claim 8, further comprising:
   continuing, by the video processing device, to send a further command, to receive a further video sample, to evaluate the further video sample to identify a further command response, to access the list of potential camera models, and to narrow the list of potential camera models based on the further combination until only the single camera model represents the first camera model.

10. The process of claim 7, further comprising sending, upon determining the first camera model, a first video capture device video feed with the video feeds to a user device.

11. The process of claim 7, wherein the first command is associated with at least one of a zoom function, a focus function, an exposure function, a white or color balance function, an audio function, or a shutter speed function.

12. A video processing device configured to aggregate video feeds from a plurality of video capture devices and to distribute the aggregated video feeds to user devices over a wireless network, the video processing device comprising:
   a processor; and
   a computer-readable storage medium storing a computer-executable code that, when executed by the processor, causes the video processing device to perform the operations of:
   receiving a first video sample from a first video capture device of the plurality of video capture devices;

sending a first command to the first video capture device;

receiving a second video sample from the first video capture device subsequent to the sending of the first command;

evaluating the first video sample and the second video sample in view of the first command to identify a first command response; and determining a first camera model based on the identified first command response, wherein when executing the computer-executable code, the video processing device:

accesses a list of potential camera models, each with a command response profile comprising one or more combinations of commands and command responses that identify a respective camera model; and identifies the first video capture device as the first camera model if a first combination of the first command and the first command response narrows the list of potential camera models to a single camera model representing the first camera model.

13. The video processing device of claim 12, wherein, when executing the computer-executable code, the video processing device:

receives the first video sample as video of a first stationary object and receives the second video sample as video of the first stationary object.

14. The video processing device of claim 12, wherein, when executing the computer-executable code, the video processing device:

receives an initial communication from the first video capture device;

identifies a network identifier associated with the initial communication;

accesses stored data to determine if the network identifier associated with the initial communication is linked to information indicating a prospective first camera model; and selects the first command from a group of potential commands based on the prospective first camera model.

15. The video processing device of claim 12, wherein, when executing the computer-executable code, the video processing device:

identifies the first command response by comparing the first video sample and the second video sample to identify a first distinction between the first video sample and the second video sample that represents the first command response.

16. The video processing device of claim 12, wherein, when executing the computer-executable code, the video processing device:

sends a second command to the first video capture device if the first combination of the first command and the first command response fails to narrow the list of potential camera models to the single camera receives, in response to the second command, a third video sample from the first video capture device subsequent to the sending of the second command;

evaluate, upon receipt of the third video sample, the second video sample and the third video sample in view of the second command to identify a second command response;

access, upon identification of the second command response, the list of potential camera models; and identify, upon accessing the list, the first video capture device as the first camera model if a second combination of the second command and the first command response in view of the first combination narrows the list of potential camera models to the single camera model representing the first camera model.

17. The video processing device of claim 16, wherein, when executing the computer-executable code, the video processing device:

continues to send a further command, to receive a further video sample, to evaluate the further video sample to identify a further command response, to access the list of prospective camera models, and to narrow the list of potential camera models based on the further combination until only the single camera model represents the first camera model.

18. The video processing device of claim 12, wherein the first command is associated with at least one of a zoom function, a focus function, an exposure function, a white or color balance function, an audio function, or a shutter speed function.

* * * * *